(12) United States Patent
Maeda et al.

(10) Patent No.: US 6,840,635 B2
(45) Date of Patent: Jan. 11, 2005

(54) POLARIZER AND METHOD OF PRODUCING THE SAME

(75) Inventors: Hiroe Maeda, Osaka (JP); Hirotaka Matsuura, Osaka (JP); Shuuji Yano, Osaka (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 10/033,893

(22) Filed: Jan. 3, 2002

(65) Prior Publication Data

US 2003/0001988 A1 Jan. 2, 2003

(30) Foreign Application Priority Data

May 14, 2001 (JP) .................................. P2001-143834

(51) Int. Cl.[7] .............................................. G02B 5/12
(52) U.S. Cl. ...................... 359/512; 359/507; 359/485; 359/483
(58) Field of Search .............................. 359/485, 507, 359/512, 513, 483, 490, 491, 492, 500; 264/1.31, 1.34, 1.35; 252/585; 248/424.4, 424.2

(56) References Cited

U.S. PATENT DOCUMENTS

| 4,292,370 A | * | 9/1981 | Pekko | .................. 428/355 N |
| 5,726,995 A | * | 3/1998 | Wong | ..................... 428/424.4 |
| 5,753,140 A | * | 5/1998 | Shigemura | ............. 252/299.01 |
| 6,008,940 A | * | 12/1999 | Michihata et al. | .......... 359/483 |
| 6,511,756 B1 | * | 1/2003 | Obuchi et al. | .............. 428/517 |

FOREIGN PATENT DOCUMENTS

| JP | 59-159109 | * | 9/1984 | ............ G02B/5/30 |
| JP | 6-51117 | | 2/1994 | |
| JP | 06-123077 | * | 5/1994 | ........ D06M/15/564 |
| JP | 7-77608 | | 3/1995 | |
| JP | 11-142645 | | 5/1999 | |
| WO | WO 97/47167 | | 12/1997 | |

OTHER PUBLICATIONS

Patent Abstract of Japan, 06–051117, Feb. 25, 1994.
Patent Abstract of Japan, 07–077608, Mar. 20, 1995.
Patent Abstract of Japan, 11–142645, May 28, 1999.

* cited by examiner

*Primary Examiner*—Drew A. Dunn
*Assistant Examiner*—Joshua L Pritchett
(74) *Attorney, Agent, or Firm*—Sughrue Mion, PLLC

(57) ABSTRACT

An iodine-PVA polarizing element 30 μm thick is dried by heating at 50° C. for 30 minutes to thereby obtain a polarizing element having a moisture content of 4.9% by weight. A pair of 100 μm-thick norbornene resin films (tradename "ARTON" made by JSR Corporation) used as protective films are stuck to opposite surfaces of the obtained polarizing element through layers of PVA adhesive agents which are applied on the pair of nonbornene resin films respectively and dried, to form, a polarizer.

1 Claim, 1 Drawing Sheet

POLARIZER AND METHOD OF PRODUCING THE SAME

The present application is based on Japanese Patent Applications No. 2000-208861 and 2001-143834, which are incorporated herein by reference.

BACKGROUND OF THE INVENTION

1. Field of the Invention

The present invention relates to a polarizer used in a liquid-crystal display device, and a method of producing the polarizer; and particularly to a polarizer which is excellent in environmental durability so as to cause little change in transmittance of light rays, degree of polarization, hue of an image, and so on, even in a severe environment such as under a high-temperature condition or a high-humidity condition.

2. Description of the Related Art

Liquid-crystal display devices have been used in gauges in personal computers, desk-top calculators, electronic clocks, word-processors, automobiles and other machines recently. The demand for polarizers with high polarization performance has increased along with the use of such liquid-crystal display devices. Since such liquid-crystal display devices have been particularly used in all fields recently, it is therefore necessary to assume that the liquid-crystal display devices may be used under severe conditions. There is consequently a demand for polarizers which are excellent in durability so as to cause little change in transmittance of light rays, degree of polarization, hue of an image, and so on, even under a high-temperature condition or a high-humidity condition.

As a polarizer of this type, in the background art, generally used is a polarizer constituted by a polarizing element made of a polyvinyl alcohol (PVA) film containing iodine or dichromatic dye adsorbed thereto; and a pair of protective films each made of a triacetyl cellulose (TAC) film or the like and disposed on opposite, front and rear surfaces of the polarizing element so that the polarizing element is held between the pair of protective films, because of its relatively inexpensive cost and excellent polarization performance.

That is, the background-art polarizer is produced by a method including the steps of: dyeing a PVA film with a dichromatic iodine or dichromatic dye; crosslinking the PVA film with boric acid, diborate, or the like; orienting the PVA film uniaxially (in which the dyeing, crosslinking and orienting steps need not be performed separately, that is, maybe performed simultaneously, and the sequence of the respective steps is not particularly limited to the aforementioned sequence); drying the PVA film; and sticking the PVA film to protective films such as TAC films. Since the TAC films are high in moisture permeability and moisture absorptivity, there has however arisen a problem that superfluous moisture enters the polarizer to thereby deteriorate the characteristic of the polarizer in the outdoor or on-vehicle field requiring high thermal reliability under a high-humidity or high-temperature condition. In such a circumstance, examination has been made into the point that transparent films low in moisture permeability and moisture absorptivity are used as protective layers in a polarizer which uses a polyvinyl alcohol film containing iodine or dichromatic dye adsorbed thereto as a polarizing element (hereinafter abbreviated to "PVA polarizing element") (Unexamined Japanese Patent Publications No. Hei. 6-51117, 7-77608 and 11-142645).

However, since the PVA polarizing element is hydrophilic, the polarizing element per se has high hygroscopicity originally. If a measure that simply films low in moisture permeability or moisture absorptivity are used as protective films as described above is taken, penetration of moisture exhaled from the PVA polarizing element is prevented so that the inside of the polarizer per se located in a high-temperature environment or the like turns into a high-temperature high-humidity state. As a result, the quantities of change in transmittance of light rays (hereinafter simply referred to as transmittance), degree of polarization, and so on, become large, so that the reliability of the polarizer is lowered.

SUMMARY OF THE INVENTION

An object of the present invention is to solve the problem as described in the background art and to provide a polarizer using a PVA polarizing element and having a good reliability under a high-temperature or high-humidity condition even in the case where protective films with low moisture permeability are used. As a result of eager investigation into the moisture content of the PVA polarizing element and the moisture permeability of the protective films in a polarizer constituted by a PVA polarizing element and a pair of transparent protective films laminated on opposite sides of the polarizing element so as to serve as films for protecting the polarizing element, the inventors of the present invention have found that a polarizer high in reliability and excellent in durability can be obtained when the protective films with low moisture permeability are stuck to opposite surfaces of the PVA polarizing element under the condition that the moisture content of the PVA polarizing element is made as low as possible. Thus, the inventors have reached the present invention.

That is, according to the present invention, a polarizer and a method of producing the polarizer are as follows.

(1) A polarizer at least constituted by a polyvinyl alcohol polarizing element, and two protective films between which the polarizing element is held, wherein a moisture content of the polarizer is not higher than 3% by weight.

(2) In the polarizer defined in the item (1), preferably, moisture permeability of each of the protective films is in a range of from 5 to 300 $(g/m^2 \cdot 24\ h)$ at 40° C.×90% R.H.

(3) In the polarizer defined in the item (2), preferably, each of the protective films is made of a resin selected from the group consisting of a polyester resin, a polyimide resin, a norbornene resin, and a polyolefin resin.

(4) A method of producing a polarizer including the step of sticking two protective films to opposite surfaces of a polyvinyl alcohol polarizing element so that the polyvinyl alcohol polarizing element is held between the two protective films, wherein the two protective films are stuck under the condition that a moisture content of the polyvinyl alcohol polarizing element is adjusted to be not higher than 15% by weight.

(5) In a method of producing a polarizer defined in the item (4), preferably, moisture permeability of each of the protective films is in a range of from 5 to 300 $(g/m^2 \cdot 24\ h)$ at 40° C.×90% R.H.

(6) In a method of producing a polarizer defined in the item (5), preferably, each of the protective films is made of a resin selected from the group consisting of a polyester resin, a polyimide resin, a norbornene resin, and a polyolefin resin.

Features and advantages of the invention will be evident from the following detailed description of the preferred embodiments described in conjunction with the attached drawings.

DETAILED DESCRIPTION OF THE PREFERRED EMBODIMENTS

Figure 1:
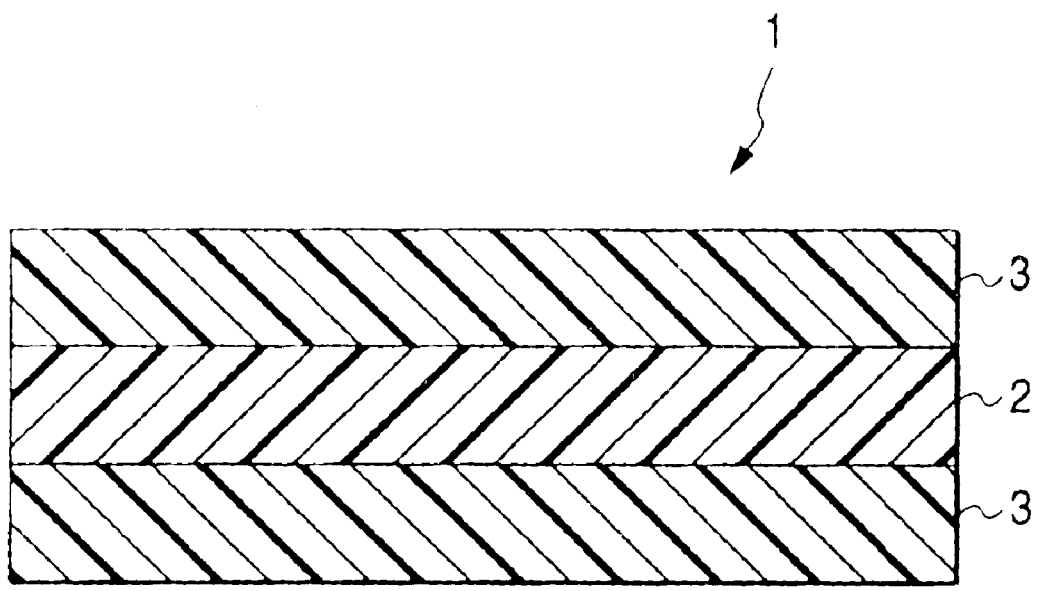
FIG. 1 shows a sectional view of a polarizer according an embodiment of the present invention.

As shown in FIG. 1, a polarizer 1 according to the present invention is basically constituted by: a polarizing element 2 made of a polyvinyl alcohol (PVA) film containing iodine or dichromatic dye adsorbed thereto; and a pair of transparent protective films 3,3 bonded to opposite sides of the polarizing element through suitable adhesive layers, for example, adhesive layers made of a polyvinyl alcohol polymer or the like, so that the pair of transparent protective films serve as films for protecting the polarizing element.

According to the present invention, in the polarizer at least constituted by the PVA polarizing element and the pair of protective films between which the PVA polarizing element is held, it is necessary that the moisture content of the polarizer is not higher than 3% by weight (percent by weight of the moisture content will be hereinafter simply expressed as percent of the moisture content). To make the durability of the polarizer better, it is preferable that the moisture content is not higher than 1%. If the moisture content of the polarizer were higher than 3%, the quantity of the change of the transmittance, the quantity of the change of the degree of polarization or the quantity of the change of the hue would become large in a high-temperature or high-humidity environment so that a polarizer with good durability could not be obtained.

The polarizer according to the present invention, that is, the polarizer at least constituted by the PVA polarizing element and the pair of protective films between which the PVA polarizing element is held, can be produced by sticking the pair of protective films to opposite surfaces of the PVA polarizing element under the condition that the moisture content of the PVA polarizing element is adjusted to be not higher than 15%. Preferably, the polarizer with better durability can be produced by sticking the pair of protective films to opposite surfaces of the PVA polarizing element under the condition that the moisture content of the PVA polarizing element is adjusted to be not higher than 5%. Incidentally, if the pair of protective films were stuck to opposite surfaces of the PVA polarizing element under the condition that the moisture content of the PVA polarizing element was higher than 15%, it would be difficult to adjust the moisture content of the polarizer to be not higher than 3%, more difficult to adjust the moisture content to be not higher than 1%.

Incidentally, the polarizer according to the present invention is produced, for example, by a method including the steps of: dyeing a PVA film with iodine or dichromatic dye absorbed thereto; crosslinking the PVA film with a boron compound such as boric acid, diborate, or the like; orienting the PVA film uniaxially (in which the dyeing, crosslinking and orienting steps need not be performed separately, that is, may be performed simultaneously, and the sequence of the respective steps is not particularly limited to the aforementioned sequence); drying the PVA film; and sticking the PVA film to protective films.

A method for producing such a polyvinyl alcohol film includes the steps of: casting a crude solution of polyvinyl alcohol dissolved in water or an organic solvent to thereby form a film; orienting (wet-orienting) the film in a bath; dyeing the film with iodine or a dichromatic dye such as an azo dye, an anthraquinone dye, a tetrazine dye, or the like; and then treating the film with a boron compound. In the method, the orienting step may be performed before or after the dyeing step or may be performed simultaneously to the dyeing step. Examples of the solvent used for preparing the crude solution include: water; dimethyl sulfoxide; N-methyl pyrolidone; glycerine; polyhydric alcohol such as ethylene glycol, propylene glycol, diethylene glycol, triethylene glycol, tetraethylene glycol, trimethylolpropane, etc.; amines such as ethylenediamine, diethylenetriamine, etc.; and mixtures thereof. It is preferable that the film is uniaxially oriented by 3.5 times or more, especially by 4.5 times or more. On this occasion, the film may be further oriented in a direction perpendicular to the aforementioned direction (to such a degree that widthwise shrinkage is prevented or more largely than the degree). The appropriate temperature for orientation is in a range of from 30 to 130° C. Incidentally, the aforementioned example is a typical example of wet orienting but the orientation of the polyvinyl alcohol film is not limited thereto. For example, there may be used any other suitable orienting method such as a dry-orienting method in which the film is oriented before immersed in the wet bath.

Dyeing the film with dichromatic dye or iodine, that is, adsorption of dichromatic dye or iodine to the film is performed by contact of the film with a liquid containing dichromatic dye or iodine. Generally, an aqueous solution of iodine-potassium iodideoran aqueous solution of a dichromatic dye such as an azo dye, an anthraquinone dye, a tetrazine dye, or the like, is used. The appropriate concentration of iodine is from 0.1 to 2.0 g/l. The appropriate concentration of potassium iodide is from 10 to 50 g/l. The appropriate weight ratio of iodine to potassium iodide is from 20 to 100. The appropriate concentration of the dichromatic dye is from 0.1 to 3.0 g/l. The dyeing time is practically from about 30 to about 500 sec.

The method of adjusting the moisture content of the polarizing element obtained as described above to be in the aforementioned small range is not particularly limited but, for example, the following methods may be used.

(1) The temperature for drying the polarizing element is made high. The drying temperature is not particularly limited but, for example, the drying temperature is set to be in a range of from 30° C. to 80° C.

(2) The time for drying the polarizing element is made long. The drying time is not particularly limited but, for example, the drying time is set to be in a range of from 10 minutes to 1 hour.

(3) The polarizing element is once wound up and dried at a temperature of from 20° C. to 50° C. for a time of from 1 hour to 24 hours and then stuck to the protective films.

(4) The polarizing element is produced by dry orienting. (For example, the polarizing element is produced by a method in which a polyvinyl alcohol film is dry-oriented by 1.5 times to 5 times under a heating atmosphere of 70° C. to 150° C. and then dyed with dichromatic dye or iodine.)

When the polarizing element with such a low moisture content is used, exhalation of moisture in a heating reliability test can be suppressed to prevent the inside of the polarizer from turning into a high-humidity atmosphere. As a result, heating durability of the polarizer can be improved.

As each of the transparent protective films for holding the PVA polarizing element therebetween, it is preferable to use a suitable one excellent in transparency, mechanical characteristic, thermal stability and having moisture permeability of from 5 to 300 (g/m$^2$·24 h) under a condition of 40° C.×90% R.H. A transparent protective film with moisture permeability of not lower than 5 (g/m$^2$·24 h) under a condition of 40° C.×90% R.H can be used to provide a polarizer free from the problem that the residual moisture in the polarizing element makes optical durability deteriorate. Preferably, by using a film with moisture permeability of not higher than 300 (g/m$^2$·24 h) under a condition of 40° C.×90% R.H, the optical durability of the polarizer can be prevented from being lowered because of penetration of moisture from the ambient atmosphere.

Typical examples of the protective films include films of polyester resin, polyimide resin, norbornene resin, polyolefin resin, or the like.

Examples of the polyester resin include: polyethylene terephthalate; polyethylene naphthalate, polybutylene terephthalate; polyethylene terephthalate-isophthalate copolymer; and soon. Examples of the polyimide resin include: resin produced by a condensation reaction, an imide ring closure reaction or the like between aromatic carboxylic anhydride and aromatic diamine such as pyromellitic dianhydride and diaminodiphenyl ether; additional polyimide obtained from maleic anhydride and aromatic diamine such as diaminodiphenylmethane; and so on. Examples of the norbornene resin include: (a) a resin obtained by hydrigenating a ring-opened (co)polymer of norbornene monomer after denaturation such as addition of maleic acid, addition of cyclopentadiene; (b) a resin obtained by addition polymerization of a norbornene monomer; (c) a resin obtained by addition polymerization of a norbornene monomer and an olefin monomer such as ethylene or α-olefin; (d) a resin obtained by addition polymerization of a norbornene monomer and a cyclic olefin monomer such as cyclopentenem cyclooctene or 5,6-dihydrodicyclopentadiene; and so on. Examples of the polyolefin resin include: homopolymer or copolymer of α-olefin, such as polyethylene, polypropylene, ethylene-propylene copolymer or poly-4-methylpentene-1, having 1 to 6 carbon atoms; and so on.

Each of the transparent protective films may be subjected to a hard coat treatment, an anti-reflection treatment or a treatment for anti-sticking, diffusion, anti-glare, etc., if the gist of the present invention is not spoiled. For example, the hard coat treatment is performed for the purpose of preventing the surface of the polarizer from being damaged. For example, a hardened coating film excellent in hardness, sliding characteristic, etc. can be formed on a surface of the transparent protective film by a system of adding a suitable ultraviolet-curable resin such as a silicone resin to the surface of the protective film.

On the other hand, the anti-reflection treatment is performed for the purpose of preventing external light from being reflected on a surface of the polarizer. The anti-reflection treatment may be achieved by formation of an anti-reflection film in accordance with the background art. Further, the anti-sticking treatment is performed for the purpose of preventing the transparent protective film from adhering closely to an adjacent layer. The anti-glare treatment is performed for the purpose of preventing visibility of light, which is transmitted through the polarizer, from being disturbed by external light reflected on a surface of the polarizer. For example, the anti-glare treatment can be made by a system in which a fine irregularity structure is added to a surface of the transparent protective film by a suitable system such as a surface-roughening system using sandblasting, embossing, or the like, or a transparent particle mixing system.

Examples of the aforementioned transparent fine particles include particles having a mean particle size of from 0.5 to 20 μm and made of silica, alumina, titania, zirconia, tin oxide, indium oxide, cadmium oxide, antimony oxide, etc. Inorganic fine particles which are electric conductive may be used as the transparent fine particles. Alternatively, organic fine particles made of crosslinked or non-crosslinked granular polymer, etc. may be used as the transparent fine particles. The amount of the transparent fine particles used is generally in a range of from 2 to 70 parts by weight, especially in a range of from 5 to 50 parts by weight, with respect to 100 parts by weight of the transparent resin.

The transparent fine particle-containing anti-glare layer may be provided as the transparent protective film itself or as a coating layer or the like applied on a surface of the transparent protective film. The anti-glare layer may serve also as a diffusing layer (visual angle compensating function, or the like) for diffusing light transmitted through the polarizer to thereby enlarge the visual angle. Incidentally, the anti-reflection layer, the anti-sticking layer, the diffusing layer, the anti-glare layer, or the like, may be provided as an optical layer constituted by a sheet of the layer so as to be a separate layer from the transparent protective film.

When the PVA polarizing element is to be stuck to each of the protective films, an adhesive agent or tackiness agent is used. From the point of view to change moisture content and characteristic of the polarizer, it is preferable that the adhesive agent or tackiness agent contains a small amount of volatile component so as to be treated in a short time without necessity of any high temperature at the time of curing or drying. Specific examples of the adhesive agent or tackiness agent include: a polyvinyl alcohol (PVA) adhesive agent; an acrylic tackiness agent; a polyester-isocyanate adhesive agent; an adhesive agent made of a water-soluble crosslinking agent of a polyvinyl alcohol polymer such as boric acid, diborate, glutaric aldehyde, melamine or oxalic acid; and so on.

Incidentally, the thickness of the polarizing element is not particularly limited but, generally, a polarizing film having a thickness of from about 15 to about 30 μm is preferably used. The thickness of each of the protective films is preferably in a range of from 80 to 25 μm, more preferably in a range of from about 60 to about 25 μm.

A tackiness agent layer or a peel film may be further added to the polarizer obtained as described above.

The present invention will be described more specifically on the basis of the following examples. However, the present invention is not limited to the specific description of the examples.

EXAMPLE 1

While a 75 μm-thick long-size polyvinyl alcohol film constituted by a polyvinyl alcohol film (9P75R) made by Kuraray Co., Ltd. was continuously carried through guide rolls, the polyvinyl alcohol film was immersed in a dyeing bath (30° C.) of a mixture of iodine and potassium iodide so as to be subjected to a dyeing treatment and a 2.5-fold orienting treatment. Then, the polyvinyl alcohol film was subjected to an orienting treatment and a crosslinking treatment so as to be oriented by 5 times in total in an acid bath (60° C.) of boric acid containing potassium iodide. The thus obtained iodine-PVA polarizing element abuot 30 μm thick was dried in a drier at 50° C. for 30 minutes. Thus, the polarizing element was obtained as a polarizing element containing 4.9% of moisture. Then, PVA adhesive agents serving as adhesive layers were applied on 100 μm-thick norbornene resin films (tradename "ARTON" made by JSR Corporation) used as protective films. Then, the PVA adhesive agents were dried and the norbornene resin films were stuck to opposite surfaces of the polarizing element through the PVA adhesive agents. Thus, a polarizer was obtained.

The characteristic of the obtained polarizer was shown in Table 1.

EXAMPLE 2

A polarizer was obtained in the same manner as in Example 1 except that the polarizing element in Example 2 was obtained as a polarizing element containing 7.5% of moisture by drying an about 30 μm-thick iodine-PVA polarizing element produced in the same manner as in Example 1 in a drier at 50° C. for 10 minutes.

The characteristic of the obtained polarizer was shown in Table 1.

EXAMPLE 3

An about 30 μm-thick iodine-PVA polarizing element produced in the same manner as in Example 1 was dried in a drier at 50° C. for 5 minutes. Thus, the polarizing element was obtained as a polarizing element containing 10.0% of moisture. Then, a polarizer was obtained in the same manner as in Example 1 except that 50 μm-thick polycarbonate films (polycarbonnate films made by Kaneka Corporation) were used as protective films.

The characteristic of the obtained polarizer was shown in Table 1.

COMPARATIVE EXAMPLE 1

An about 30 μm-thick iodine-PVA polarizing element produced in the same manner as in Example 1 was dried in a drier at 25° C. for 2 minutes. Thus, the polarizing element was obtained as a polarizing element containing 19.5% of moisture. Then, opposite surfaces of the polarizing element were held between 80 μm-thick TAC (triacetyl cellulose) films used as protective films, and a PVA adhesive agent was dropped in between the films so that the polarizser was stuck to the TAC films. Thus, a polarizer was obtained.

The characteristic of the obtained polarizer was shown in Table 1.

COMPARATIVE EXAMPLE 2

A polarizing element containing 4.9% of moisture was obtained in the same manner as in Example 1. Then, PVA (polyvinyl alcohol) adhesive agents serving as adhesive layers were applied on 80 μm-thick TAC (triacetyl cellulose) films used as protective films. Then, the PVA adhesive agents were dried and the TAC films were stuck to opposite surfaces of the polarizing element through the PVA adhesive agents. Thus, a polarizer was obtained.

The characteristic of the obtained polarizer was shown in Table 1.

COMPARATIVE EXAMPLE 3

A polarizer was obtained in the same manner as in Example 1 except that a polarizing element containing 19.5% of moisture was obtained in the same manner as in Comparative Example 1.

The characteristic of the obtained polarizer was shown in Table 1.

The following characteristics of the polarizing element and polarizer obtained in each of Examples 1 to 3 and Comparative Example 1 to 3 were evaluated.

(Method of Measuring the Moisture Permeability of Protective Film)

The moisture permeability of each protective film was measured under a test condition of 40° C./90% R.H (R.H: relative humidity) by a method according to JIS Z 0208.

(Measurement of Moisture Content)

Moisture Content of the Polarizing Element:

A part of the polarizing element was cut off (sample size 10×30 mm) just before the protective films were stuck to the polarizing element. In order to avoid the influence of atmospheric moisture, the polarizing element sample was quickly put into a heating furnace attached to a Karl Fischer moisture meter adjusted at 150° C., and a nitrogen gas was made to flow into the furnace at the rate of 200 ml/min. The nitrogen gas was bubbled in a titration cell solution in the Karl Fischer moisture meter to thereby measure the moisture content of the polarizing element.

Moisture Content of the Polarizer:

The polarizer produced was cut into a size of 10×30 mm. After the cut polarizer was left under a condition of 35° C./80% R.H for 48 hours, the moisture content of the polarizer was measured in the same manner as the polarizing element.

(Heat Resistance Test)

The polarizer was cut into a size of 25×50 mm. The cut polarizer was stuck to slide glass by an acrylic tackiness agent. After the optical characteristic (initial optical characteristic) of the polarizer was measured, the slide glass with the polarizer was put into a drier at 90° C. After the slide glass with the polarizer was left in the drier for a predetermined time, the optical characteristic (optical characteristic after the test) of the polarizer was measured.

(Humidity Resistance Test)

The polarizer was cut into a size of 25×50 mm. The cut polarizer was stuck to slide glass by an acrylic tackiness agent. After the optical characteristic (initial optical characteristic) of the polarizer was measured, the slide glass with the polarizer was put into a drier under a condition of 60° C./95% R.H. After the slide glass with the polarizer was left in the drier under the above-mentioned condition for a predetermined time, the optical characteristic (optical characteristic after the test) of the polarizer was measured.

(Measurement of Optical Characteristic)

Quantity of the Change of Light Ray Transmittance:

Luminous efficiency was corrected to measure the light ray transmittance (hereinafter simply referred to as transmittance) in accordance with JIS Z-8701.

The quantity of the change of the transmittance was calculated as follows.

Quantity of Change of Transmittance=Transmittance after Test−Initial Transmittance  Expression 1:

Degree of Polarization:

The degree of polarization was calculated by the following expression:

$$\text{Degree of Polarization} = \sqrt{((H_0 - H_{90})/(H_0 + H_{90}))} \times 100(\%)$$

Expression 2:

in which $H_0$ is parallel transmittance, and $H_{90}$ is perpendicular transmittance.

Quantity of Change of Degree of Polarization=Degree of Polarization after Test−Initial Degree of Polarization  Expression 3:

Hue a and Hue b:

Luminous efficiency was corrected to measure hue a and hue b in accordance with JIS Z-8701.

The quantity of the change of hue was calculated as follows.

Quantity of Change of Hue a=Hue a after Test−Initial Hue a  Expression 4:

Quantity of Change of Hue b=Hue b after Test−Initial Hue b

Results were shown in Table 1.

TABLE 1

|  |  | Ex. 1 | Ex. 2 | Ex. 3 | Com. Ex. 1 | Com. Ex. 2 | Com. Ex. 3 |
|---|---|---|---|---|---|---|---|
| Moisture Content of Polarizing element (% by weight) | | 4.9 | 7.5 | 10 | 19.5 | 4.9 | 19.5 |
| Moisture Permeability of Protective Film (g/m² · 24 h) | | 110 | 110 | 128 | 750 | 750 | 110 |
| Moisture Content of Polarizer (% by weight) | | 0.95 | 1.8 | 1.9 | 4 | 3.2 | 3.8 |
| Heat Resistance Test 90° C. | Change of Transmittance | 1.0 | 1.0 | 0.9 | 0.8 | 0.8 | 3.1 |
| | Change of Degree of Polarization | −1.0 | −1.7 | −1.2 | −0.9 | −1.0 | −3.2 |
| | Change of Hue a | 0.1 | 0.1 | 0.1 | −0.2 | −0.4 | 4.0 |
| | Change of Hue b | 1.5 | 2.5 | 1.3 | 1.9 | 1.5 | 1.4 |
| Humidity Resistance Test 60° C. 95% R.H | Change of Transmittance | 2.1 | 2.2 | 1.8 | 3.8 | 3.3 | 2.8 |
| | Change of Degree of Polarization | −0.3 | −0.2 | −0.1 | −2.7 | −2.4 | −0.4 |
| | Change of Hue a | −0.4 | −0.3 | −0.5 | −1.2 | −1.2 | −0.7 |
| | Change of Hue b | −0.5 | −0.7 | −0.3 | −1.2 | −1.9 | −1.0 |

The present invention can provide a polarizer which uses a PVA polarizing element and which is good in reliability and excellent in durability under a high-temperature or high-humidity condition, and a method of producing the polarizer. In a preferred mode for carrying out the present invention in which protective films with moisture permeability of from 5 to 300 (g/m²·24 h ) under a condition of 40° C.×90% R.H are used as protective films, the quantity of the change of optical characteristic in durability can be desirably reduced compared with that in the background art.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of producing a polarizer comprising:

sticking two protective films to opposite surfaces of a polyvinyl alcohol polarizing element so that the polyvinyl alcohol polarizing element is held between said two protective films, wherein said two protective films are stuck under the condition that a moisture content of said polyvinyl alcohol polarizing element is adjusted to be not higher than 15% by weight, wherein moisture permeability of each of said protective films is in a range of from 5 to 300 (g/m²·24 h) at 40° C.×90% R.H, wherein each of said protective films is a single layer film and is made of a resin selected from the group consisting of a polyester resin, a polyimide resin, a norbornene resin, and a polyolefin resin, and wherein a moisture content of said polarizer is not higher than 3% by weight.

* * * * *